US008918453B2

(12) United States Patent
Stonefield et al.

(10) Patent No.: US 8,918,453 B2
(45) Date of Patent: Dec. 23, 2014

(54) MANAGING DATA REPRESENTATION FOR USER EQUIPMENTS IN A COMMUNICATION SESSION

(75) Inventors: Anthony Pierre Stonefield, San Diego, CA (US); Shane Richard Dewing, San Diego, CA (US); Mark Aaron Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/342,809

(22) Filed: Jan. 3, 2012

(65) Prior Publication Data
US 2013/0173689 A1 Jul. 4, 2013

(51) Int. Cl.
*G06F 15/16* (2006.01)
(52) U.S. Cl.
USPC ........... 709/203; 709/229; 709/223; 709/227; 709/231; 709/232; 348/14.16
(58) Field of Classification Search
USPC ................. 709/203, 223, 227, 229, 231, 232; 348/14.1, 14.13, 14.16, 14.18
See application file for complete search history.

(56) References Cited

U.S. PATENT DOCUMENTS

| | | | | |
|---|---|---|---|---|
| 6,697,341 | B1* | 2/2004 | Roy | 370/260 |
| 7,773,598 | B2 | 8/2010 | Lindholm et al. | |
| 8,032,130 | B2* | 10/2011 | Reynolds et al. | 455/423 |
| 8,180,029 | B2* | 5/2012 | Katis et al. | 379/93.01 |
| 8,265,100 | B2* | 9/2012 | Steiner et al. | 370/503 |
| 8,549,077 | B2* | 10/2013 | Cohen et al. | 709/205 |
| 2005/0060411 | A1* | 3/2005 | Coulombe et al. | 709/227 |
| 2005/0097169 | A1* | 5/2005 | Mukherjee et al. | 709/204 |
| 2005/0164679 | A1 | 7/2005 | Beardow | |
| 2006/0031511 | A1 | 2/2006 | Salt | |
| 2007/0079252 | A1 | 4/2007 | Ramnani | |
| 2009/0161590 | A1 | 6/2009 | Lewis et al. | |
| 2009/0287832 | A1 | 11/2009 | Liang et al. | |

(Continued)

FOREIGN PATENT DOCUMENTS

WO 2011099068 A1 8/2011

OTHER PUBLICATIONS

Martínez Carreras, María A., Juan M. Marin Pérez, Jorge Bernal Bernabé, José M. Alcaraz Calero, Gregorio Martínez Pérez, and Antonio F. Gómez Skarmeta. "Towards a Semantic-Aware Collaborative Working Environment." Computing and Informatics 30, No. 1 (2013): 7-30.*

(Continued)

*Primary Examiner* — Moustafa M Meky
*Assistant Examiner* — Uzma Alam
(74) *Attorney, Agent, or Firm* — Raphael Freiwirth

(57) ABSTRACT

In an embodiment, an application server receives, from a given UE, data that is configured to visually represent physical user input detected at the given UE at a first level of precision. The application server determines data presentation capabilities of a target UE and/or a performance level associated with a connection between the application server and the target UE. The application server selectively transitions the received data from the first level of precision to a second level of precision based on the determination, and transmits the selectively transitioned data to the target UE for presentation. In another embodiment, the application server receives a request to adjust display settings of the target UE from the given UE responsive to detected physical user input. The application server selectively adjusts the target UE's display settings based on the received request.

14 Claims, 15 Drawing Sheets

(56) References Cited

U.S. PATENT DOCUMENTS

| | | |
|---|---|---|
| 2009/0309846 A1* | 12/2009 | Trachtenberg et al. ....... 345/173 |
| 2010/0124939 A1 | 5/2010 | Osborne et al. |
| 2011/0032324 A1 | 2/2011 | George et al. |
| 2011/0271235 A1 | 11/2011 | Doyen et al. |
| 2011/0283008 A1 | 11/2011 | Smelyansky |
| 2013/0050398 A1* | 2/2013 | Krans et al. ................ 348/14.07 |

OTHER PUBLICATIONS

International Search Report and Written Opinion—PCT/US2012/072015—ISA/EPO—Jul. 18, 2013.
Partial International Search Report—PCT/US2012/072015—ISA/EPO—Apr. 24, 2013.

* cited by examiner

Physical User Input and Associated Representation at UE 1

Physical User Input and Associated Representation at one or more of UEs 2...N

MANAGING DATA REPRESENTATION FOR USER EQUIPMENTS IN A COMMUNICATION SESSION

BACKGROUND OF THE INVENTION

1. Field of the Invention

Embodiments of the invention relate to managing a representation of data associated with a communication session.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN) or radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Telepresence refers to a set of technologies which allow a person to feel as if they were present, to give the appearance of being present. Additionally, users may be given the ability to affect the remote location. In this case, the user's position, movements, actions, voice may be sensed, transmitted and duplicated in the remote location to bring about this effect. Therefore information may be traveling in both directions between the user and the remote location. Telepresence via video deploys greater technical sophistication and improved fidelity of both sight and sound than in traditional videoconferencing.

Technical advancements in mobile communication systems have also extended the capabilities of videoconferencing for use with mobile devices, enabling collaboration independent of location. Differing from traditional video telepresence, mobile collaboration utilizes wireless, cellular and broadband technologies enabling effective collaboration independent of location. Mobile collaboration environment combine the use of video, audio and on-screen drawing capabilities and using mobile devices to enable multi-party conferencing in real-time, independent of location.

In a telepresence environment, a user can physically show ideas using touch points, movements and gestures, which can be communicated synchronously on other UEs. The present invention presents a means for scaling and/or representation of data stream in a real-time streaming mobile collaboration environment in accordance to UEs display capabilities and bandwidth allocation.

Many different types of UEs exist with different display capabilities. Display capabilities of UEs can vary depending in screen size, color resolution, frame rate, display resolution, color resolution, and aspect ratio. Additionally, display capabilities of UEs can vary depending on processor speed, device memory, software application. Alternatively, bandwidth allocation and the performance level of the connection to each UE can vary. Therefore, allocation for exchanging data stream varies among different transmitting and receiving UEs depending on each UE's display capabilities. Embodiments of the invention allow for the determination of the display capabilities of each UE, in order to prevent the bandwidth allocation for each UE from being either underutilized or over-utilized. The present invention presents a means for determining the capability of each UE and translating the data stream to be transmitted accordingly.

The present invention presents a means for a server to transition the display data stream based on a physical user input for transmission in a telepresence environment. The invention also provides a means for determining the data capability of the target UEs and connection performance to the target UEs, and for adjusting transmission of the display data accordingly.

SUMMARY

In an embodiment, an application server receives, from a given UE, data that is configured to visually represent physical user input detected at the given UE at a first level of precision. The application server determines data presentation capabilities of a target UE and/or a performance level associated with a connection between the application server and the target UE. The application server selectively transitions the received data from the first level of precision to a second level of precision based on the determination, and transmits the selectively transitioned data to the target UE for presentation. In another embodiment, the application server receives a request to adjust display settings of the target UE from the given UE responsive to detected physical user input.

The application server selectively adjusts the target UE's display settings based on the received request.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
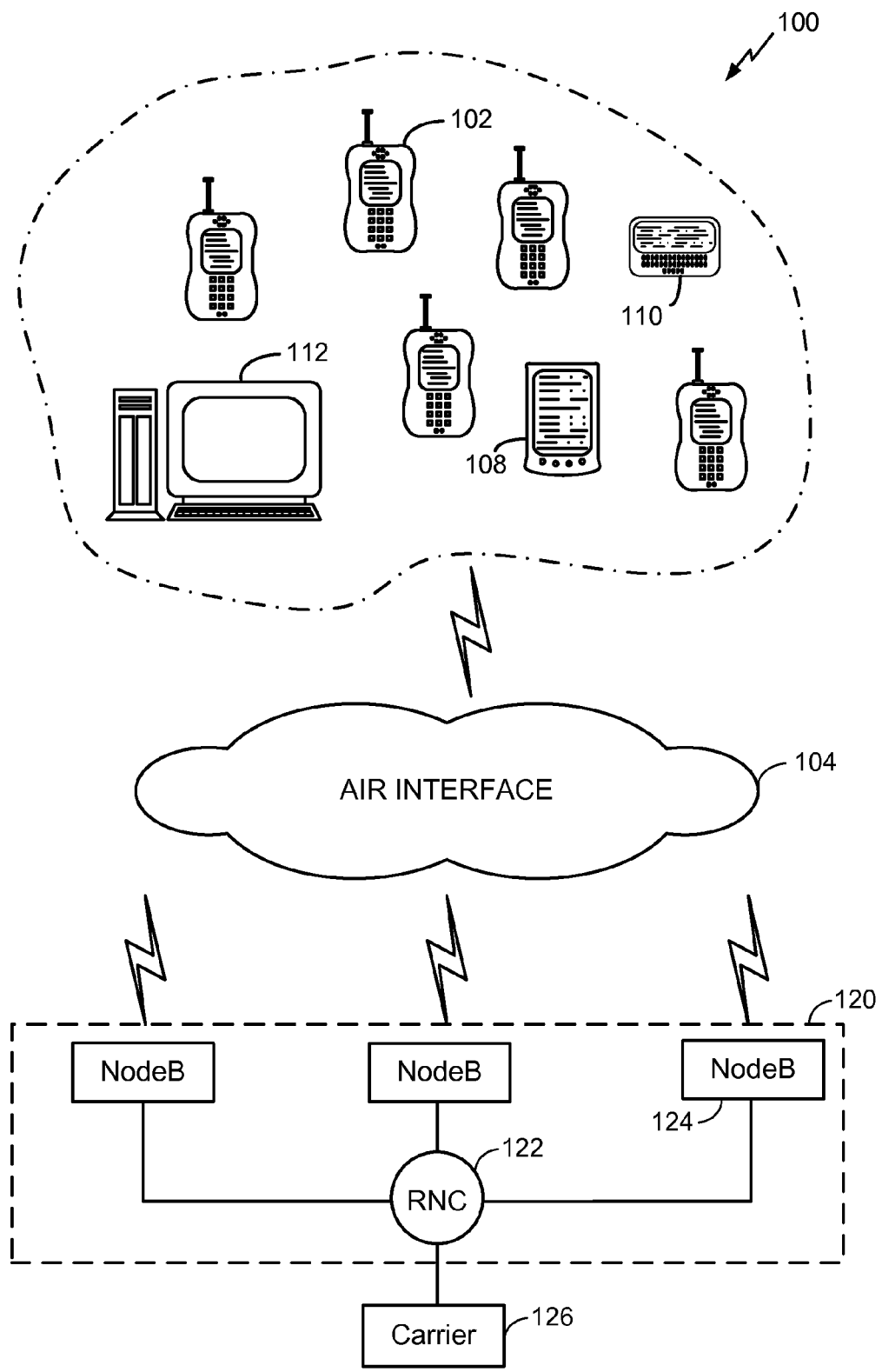
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action (e.g., described in more detail below with respect to FIG. 4).

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
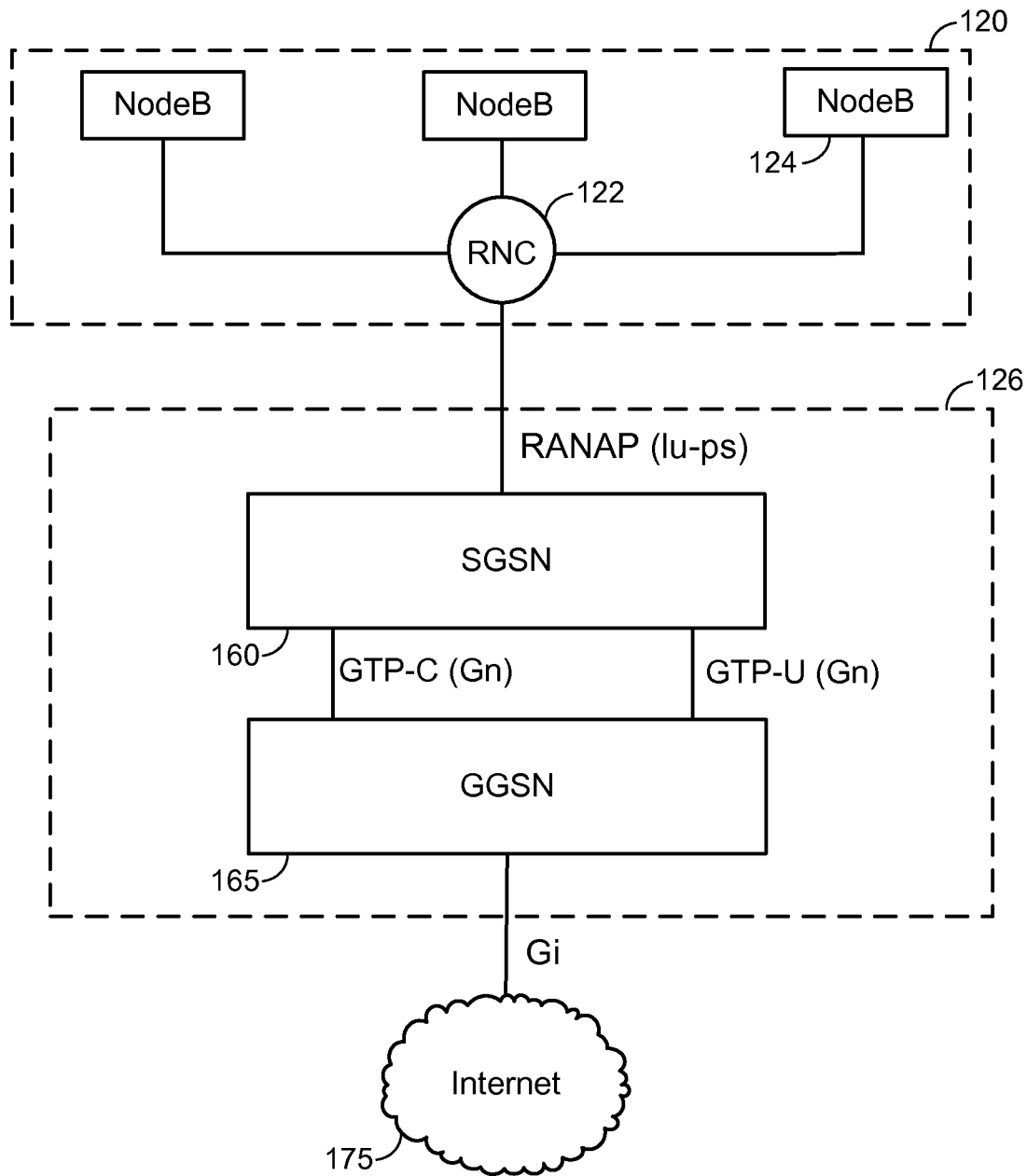
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the Internet (i.e., an external packet data network) 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Radio Access Network Application Part (RANAP) protocol. RANAP operates over a Iu interface (Iu-ps), with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). In the embodiment of FIG. 2A, the Gn between the SGSN 160 and the GGSN 165 carries both the GTP-C and the GTP-U. While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

Figure 2B:
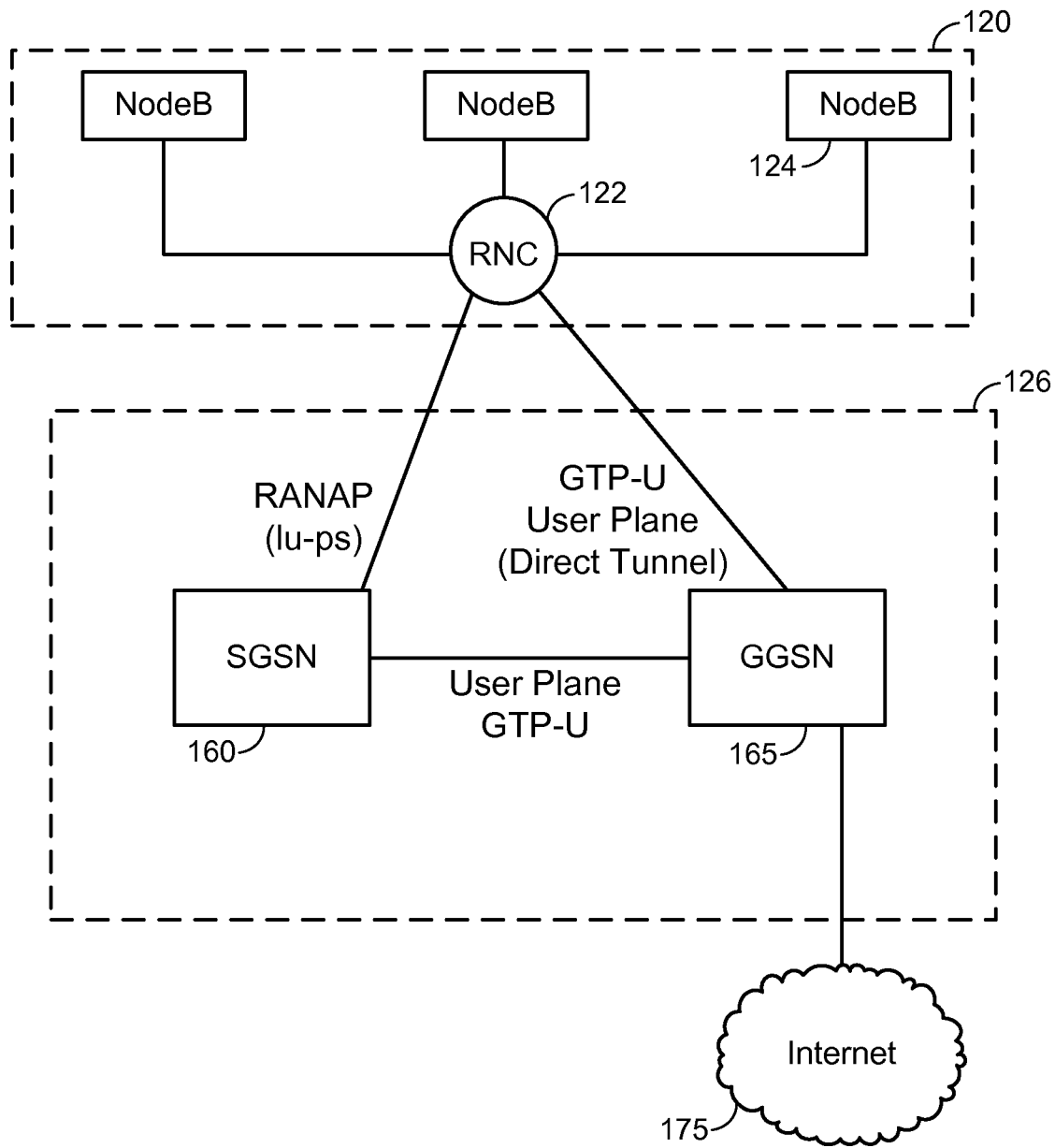
FIG. 2B illustrates the core network of FIG. 1 according to another embodiment of the present invention.

FIG. 2B illustrates the core network 126 according to another embodiment of the present invention. FIG. 2B is similar to FIG. 2A except that FIG. 2B illustrates an implementation of direct tunnel functionality.

Direct Tunnel is an optional function in Iu mode that allows the SGSN 160 to establish a direct user plane tunnel, GTP-U, between RAN and GGSN within the Packet Switched (PS) domain. A direct tunnel capable SGSN, such as SGSN 160 in FIG. 2B, can be configured on a per GGSN and per RNC basis whether or not the SGSN can use a direct user plane connection. The SGSN 160 in FIG. 2B handles the control plane signaling and makes the decision of when to establish Direct Tunnel. When the Radio Bearer (RAB) assigned for a PDP context is released (i.e. the PDP context is preserved) the GTP-U tunnel is established between the GGSN 165 and SGSN 160 in order to be able to handle the downlink packets.

The optional Direct Tunnel between the SGSN 160 and GGSN 165 is not typically allowed (i) in the roaming case (e.g., because the SGSN needs to know whether the GGSN is in the same or different PLMN), (ii) where the SGSN has received Customized Applications for Mobile Enhanced Logic (CAMEL) Subscription Information in the subscriber profile from a Home Location Register (HLR) and/or (iii) where the GGSN 165 does not support GTP protocol version 1. With respect to the CAMEL restriction, if Direct Tunnel is established then volume reporting from SGSN 160 is not possible as the SGSN 160 no longer has visibility of the User Plane. Thus, since a CAMEL server can invoke volume reporting at anytime during the life time of a PDP Context, the use of Direct Tunnel is prohibited for a subscriber whose profile contains CAMEL Subscription Information.

The SGSN 160 can be operating in a Packet Mobility Management (PMM)-detached state, a PMM-idle state or a PMM-connected state. In an example, the GTP-connections shown in FIG. 2B for Direct Tunnel function can be established whereby the SGSN 160 is in the PMM-connected state and receives an Iu connection establishment request from the UE. The SGSN 160 ensures that the new Iu connection and the existing Iu connection are for the same UE, and if so, the SGSN 160 processes the new request and releases the existing Iu connection and all RABs associated with it. To ensure that the new Iu connection and the existing one are for the same UE, the SGSN 160 may perform security functions. If Direct Tunnel was established for the UE, the SGSN 160 sends an Update PDP Context Request(s) to the associated GGSN(s) 165 to establish the GTP tunnels between the SGSN 160 and GGSN(s) 165 in case the Iu connection establishment request is for signaling only. The SGSN 160 may immediately establish a new direct tunnel and send Update PDP Context Request(s) to the associated GGSN(s) 165 and include the RNC's Address for User Plane, a downlink Tunnel Endpoint Identifier (TEID) for data in case the Iu connection establishment request is for data transfer.

The UE also performs a Routing Area Update (RAU) procedure immediately upon entering PMM-IDLE state when the UE has received an RRC Connection Release message with cause "Directed Signaling connection re-establishment" even if the Routing Area has not changed since the last update. In an example, the RNC will send the RRC Connection Release message with cause "Directed Signaling Connection re-establishment" when the RNC is unable to contact the Serving RNC to validate the UE due to lack of Iur connection (e.g., see TS 25.331 [52]). The UE performs a subsequent service request procedure after successful completion of the RAU procedure to re-establish the radio access bearer when the UE has pending user data to send.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2C:
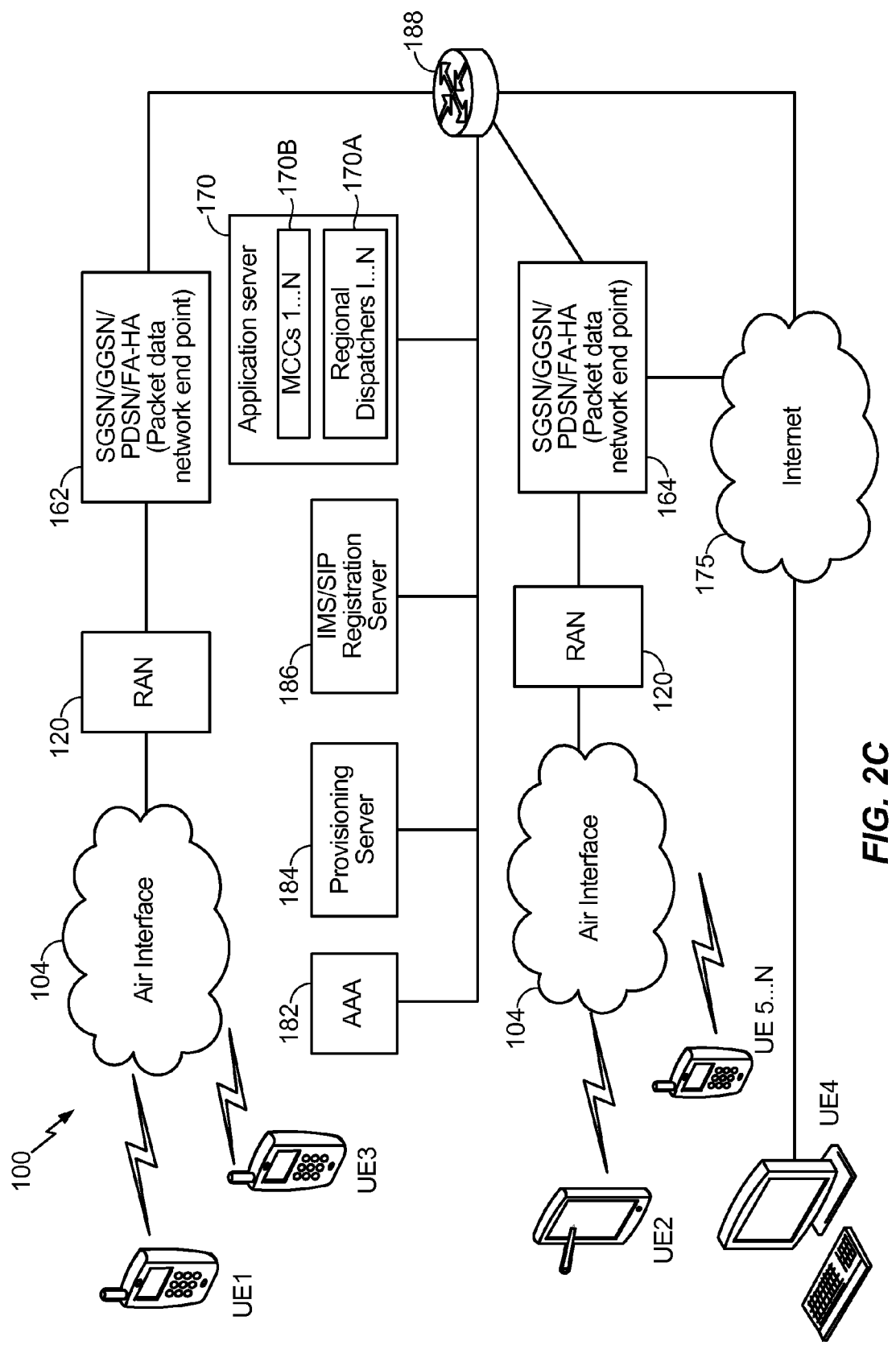
FIG. 2C illustrates an example of the wireless communications system of FIG. 1 in more detail.

FIG. 2C illustrates an example of the wireless communications system 100 of FIG. 1 in more detail. In particular, referring to FIG. 2C, UEs 1 . . . N are shown as connecting to the RAN 120 at locations serviced by different packet data network end-points. The illustration of FIG. 2C is specific to W-CDMA systems and terminology, although it will be appreciated how FIG. 2C could be modified to conform with a 1× EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2C, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2C are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2C, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that an MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
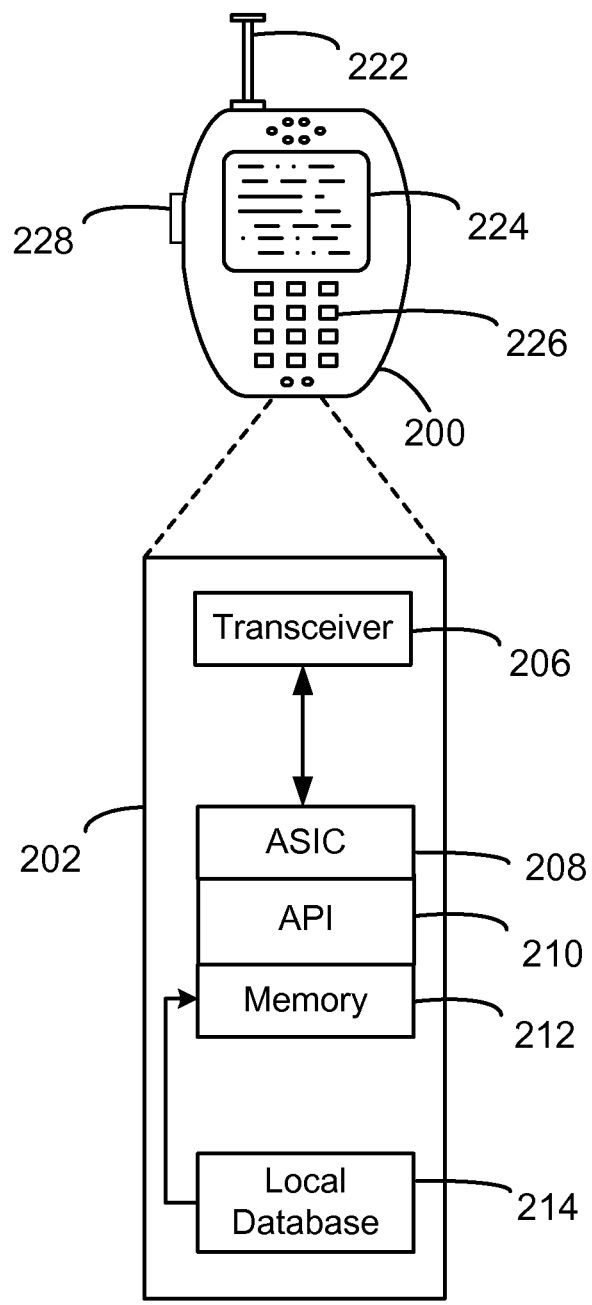
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
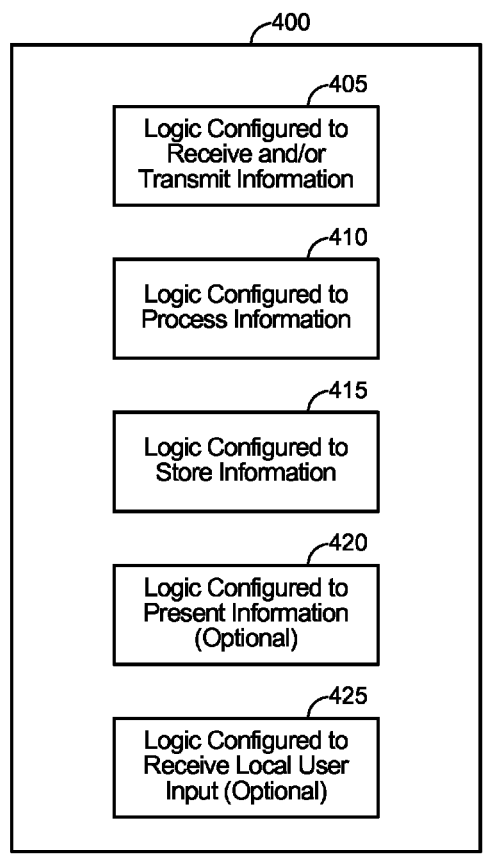
FIG. 4 illustrates a communication device that includes logic configured to receive and/or transmit information.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410. Further, the configured logics or "logic configured to" of 405 through 425 are not limited to specific logic gates or elements, but generally refer to the ability to perform the functionality describe herein (either via hardware or a combination of hardware and software). Thus, the configured logics or "logic configured to" of 405 through 425 are not necessarily implemented as logic gates or logic elements despite sharing the word "logic". Other interactions or cooperation between the configured logics 405 through 425 will become clear to one of ordinary skill in the art from a review of the embodiments described below in more detail.

It is typical for media (e.g., audio, video, text, etc.) to be presented by UEs during a server-arbitrated group communication session. For example, in a half-duplex video communication session, video media can be transmitted from a floorholder to the application server 170, and the application server 170 can then re-transmit the video media to the group for presentation at target UE(s).

In conjunction with the presentation of media during the group communication session, one or more of the UEs participating in the session can receive physical user input from their respective users and then transmit control information indicative of the received physical user input to the rest of the group. For example, the physical user input can correspond to a form of telestration (e.g., on-screen drawing) whereby a user of a given UE circles a portion of an associated display, a graphic representative of the user's circle is added to the display and then transmitted to the rest of the group where the circle is re-constituted. In this examples, the given user's attempt to highlight a point of interest on his/her display via the circle is disseminated to the rest of the group and overlaid on top of the rendering of the video media at the respective target UE(s).

However, UEs with different presentation capabilities and/or connection performance levels can participate in the same server-arbitrated communication session. For example, a UE connected to a 3G network may be part of the same communication session as a UE connected to a 4G or WLAN. In another example, a UE with a high-resolution display can be part of the same communication session as a UE with a low-resolution display. Accordingly, an embodiment of the invention are directed to an implementation whereby visual representations of physical user input are shared between UEs participating a group communication session in accordance with the capabilities and/or performance levels associated with the target UE(s).

Figure 5:
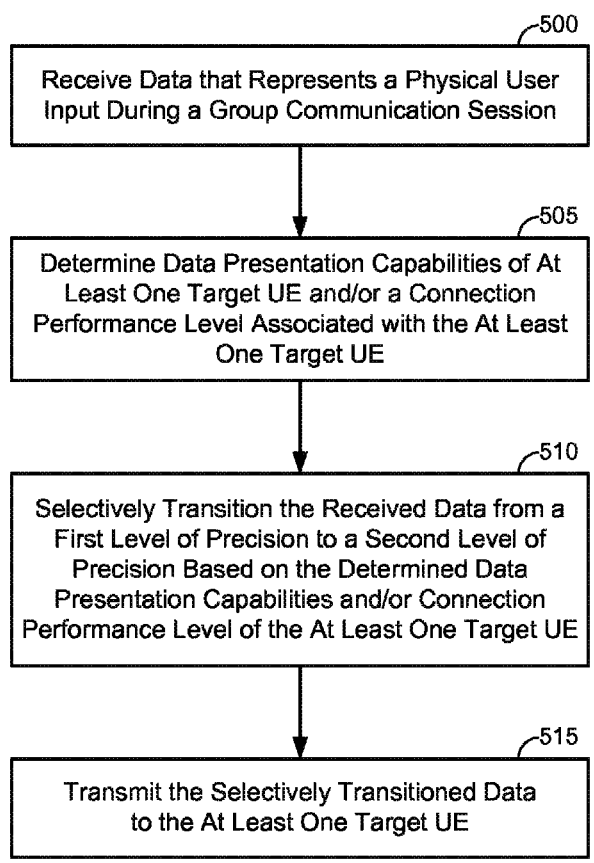
FIG. 5 illustrates a process of exchanging data representative of physical user input during a group communication in accordance with an embodiment of the present invention.

FIG. 5 illustrates a process of exchanging data representative of physical user input during a group communication in accordance with an embodiment of the present invention. Referring to FIG. 5, assume that UEs 1 . . . N (e.g., where N≥2) are engaged in a communication session that involves a graphical media representation on displays at each of UEs 1 . . . N. In an example, the communication session can correspond to a video conferencing session whereby the same video and/or image media is displayed at each of UEs 1 . . . N (e.g., a collaborative map session, etc.). Alternatively, different video and/or image media can be presented at two or more of UEs 1 . . . N (e.g., UE 1 may view UE 2's video media, UE 2 may view UE 1's video media, and so on). In an example, the video and/or image media need not be actively mediated through the application server 170, but could also be rendered independently at UEs 1 . . . N. For example, audio media can be mediated by the application server 170 (e.g., half duplex or full duplex), but the video and/or image media could be loaded separately at the UEs 1 . . . N. For example, UEs 1 . . . N could each be independently rendering a map of New York while discussing their travel plans so that the map data does not need to be actively exchanged between the UEs during the communication session.

Referring to FIG. 5, during the communication session, the application server 170 receives data from a given UE ("UE 1") that is configured to visually represent a physical user input at the given UE, 500. The physical user input that is configured to be visually represented by the data received at 500 can include a user of UE 1 circling a relevant part of the display on the given UE with his/her finger, the user highlighting a portion of the display on the given UE, and so on. The data representative of the physical user input that is received at 500 can be received in many different formats or levels of precision. For example, the received data at 500 can correspond to a set of screen coordinates that were associated with the physical user input (e.g., which when connected collectively form a circle, a squiggly line, etc.).

Referring to FIG. 5, the application server 170 then determines data presentation capabilities of at least one target UE (e.g., one or more of UEs 2 . . . N) and/or a connection performance level from the application server 170 to the at least one target UE, 505. In an example, the determined presentation capabilities of the at least one target UE can include display capability of the at least one target UE, such as, but not limited to, display size, color resolution, frame rate, display resolution, aspect ratio and so on. In another example, the determined data presentation capabilities of the at least one target UE can depend on a performance capability of the at least one target UE, such as, but not limited to, processor speed, memory capacity, type of memory, clock frequency, battery life and power conservation requirements.

Furthermore, as noted above with respect to 505 of FIG. 5, the application server 170 can also determine the connection performance level associated with the application server 170's connection to the at least one target UE. For example, the performance level to the at least one target UE can be inferred based on packet loss, round trip delay or other in-call parameters. In another example, the performance level to the target UE can be based upon information related to a serving network of the at least one target UE. For example, the application server 170 may generally determine higher performance capabilities for 4G-connected UEs as compared to 3G-connected UEs. In another example, the application server 170 may be aware of network-specific performance expectations (e.g., from prior interactions serving UEs over the same network or the same type of network, etc.)

Referring to FIG. 5, the application server 170 selectively transitions the received data from a first level of precision (e.g., a high-quality or full-quality format as received from the given UE at 500) to a second level of precision (e.g., a reduced quality format) based on the determined data presentation capabilities and/or connection performance level for the target UE, 510. For example, if the received data representative of the physical user input from 500 corresponds to a set of 1000 screen-coordinates, the transitioning of 510 can reduce the number of screen coordinates to a number that is appropriate for delivery and/or presentation at the at least one target UE based on the determined presentation capabilities and/or connection performance level of the at least one target UE (e.g., 700 screen-coordinates, coordinates for a center-point and a size of a pre-defined shape, screen-coordinates that correspond to vertexes of a pre-defined polygon and an associated center-point, etc.). In another example, the application server 170 can prioritize the transition of the received data at 510 based on an expected level of human sensitivity to each aspect targeted for transition or reduction in order to improve the user experience (e.g., reduce resolution but not frame-rate, etc.). In another example, assume that the received data representative of the physical user input from 500 includes complex forms, shading, and color coding. In this case, the transition of this data to the second level of precision at 510 can include simplifying the complex form, reducing or eliminating the shading and/or reducing the number of associated colors.

Still referring to 510 of FIG. 5, in another example, if the determined connection performance level at 505 for a particular target UE is low, the transitioned data at 510 can be scaled down to a thumbnail size and then "stretched" for presentation once received by the particular target UE in order to fill its display screen. In another example, in 510, the shape of the received data of 500 can be reconstructed to reduce image size. In another example, in 510, the received data from the given UE at 500 can contain image data that is representative of a user's selections on a map, and the received data can be converted from the image data into a set of GPS location and/or Cartesian coordinates for the map, so that the image data can be reconstructed at the display of the at least one target UE. As will be discussed below in more detail, at the application server 170, the manner in which the received data is transitioned in 510 can be the same for each target UE, or alternatively can vary between target UEs based on UE-specific determinations from 505.

Referring to FIG. 5, after the received data representative of the physical user input from the given UE is transitioned into the second level of precision at 510, the application server 170 transmits the selectively transitioned data to the at least one target UE for presentation thereon, 515.

Figure 6:
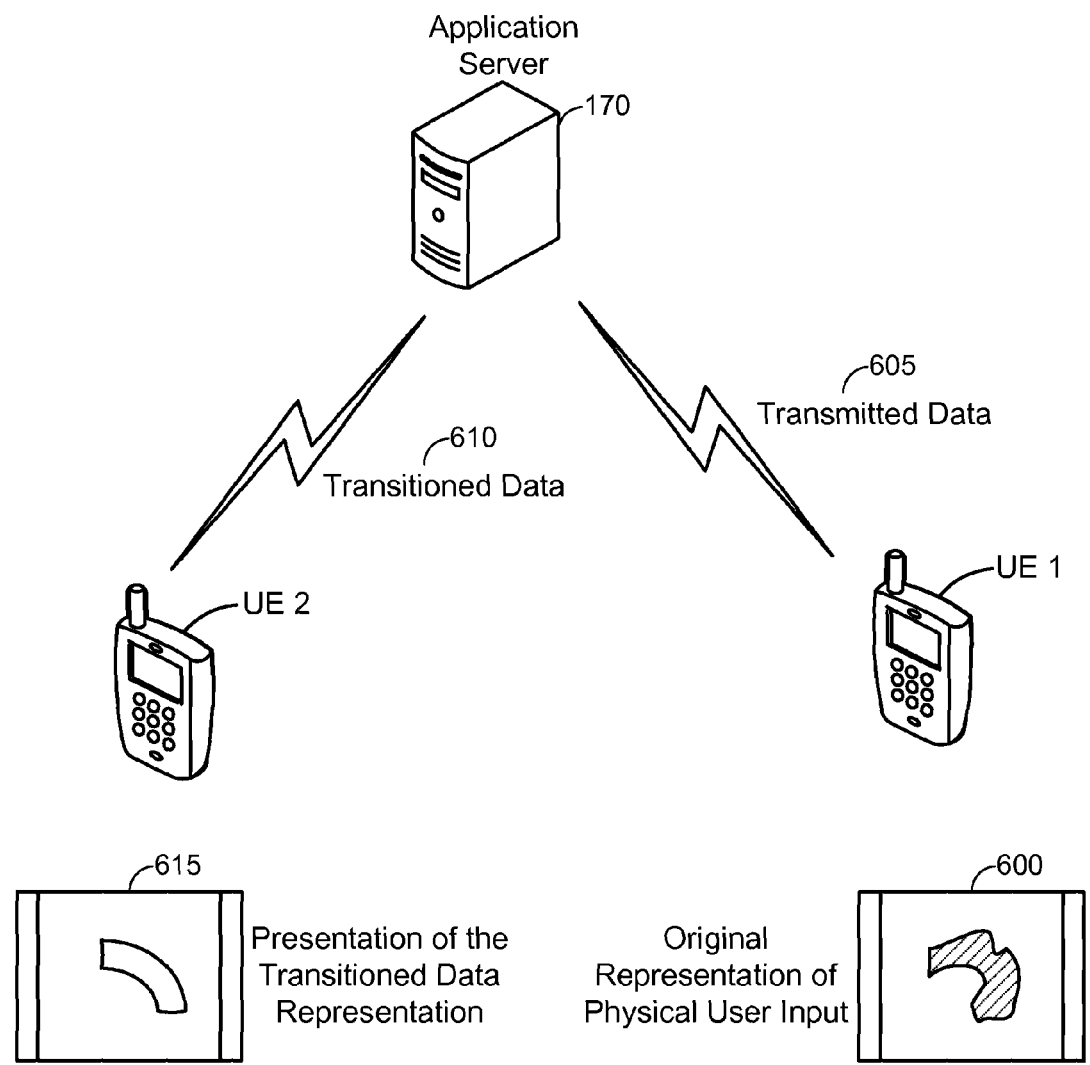
FIG. 6 illustrates a communication flow that is based upon an execution of the process of FIG. 5 in accordance with an embodiment of the invention.

FIG. 6 illustrates a communication flow that is based upon an execution of the process of FIG. 5 in accordance with an embodiment of the invention. Referring to FIG. 6, UE 1 and UE 2 are engaged in a communication session that involves some type of collaborative graphical display of media. During the communication session, a user of UE 1 provides physical user input that results in a squiggly, complex shape shown in shape 600. For example, the user of UE 1 may have waved his/her finger in proximity to a touchscreen display of UE 1, after which UE 1's sensors record the finger-waving for display as the shape 600. The shape 600 may be referred to as an original or full-quality (or high precision) representation of the physical user input (e.g., at least relative to the initial recording or capturing of the physical user input). In an example, the original representation of the physical user input can include encoding of a plurality of coordinates and/or vertexes that collectively define the shape when rendered on the display of UE 1. Data representative of the shape 600 is transmitted by UE 1 to the application server 170, 605.

While not shown in FIG. 6 explicitly, assume that the application server 170 receives the representative data from UE 1 and executes the process of FIG. 5. Thus, 610 of FIG. 6 shows the transmission of the selectively transitioned data that is representative of the shape 600, albeit in a reduced or simplified level of precision. The target UE (e.g., UE 2) receives the selectively transitioned data and presents a modified shape 615. The modified shape 615 is still representative of (or faithful to) the initial physical user input at UE 1, but the modified shape is somewhat simpler and/or reduced in comparison to the full-quality representation of the physical user input that was captured and then presented at UE 1. The reduction and/or simplification to the data representative of the physical user input can occur for a number of reasons as noted above with respect to FIG. 5, such as a low-bandwidth connection between the application server 170 and UE 2, display restrictions associated with UE 2, etc.

Figure 7A:
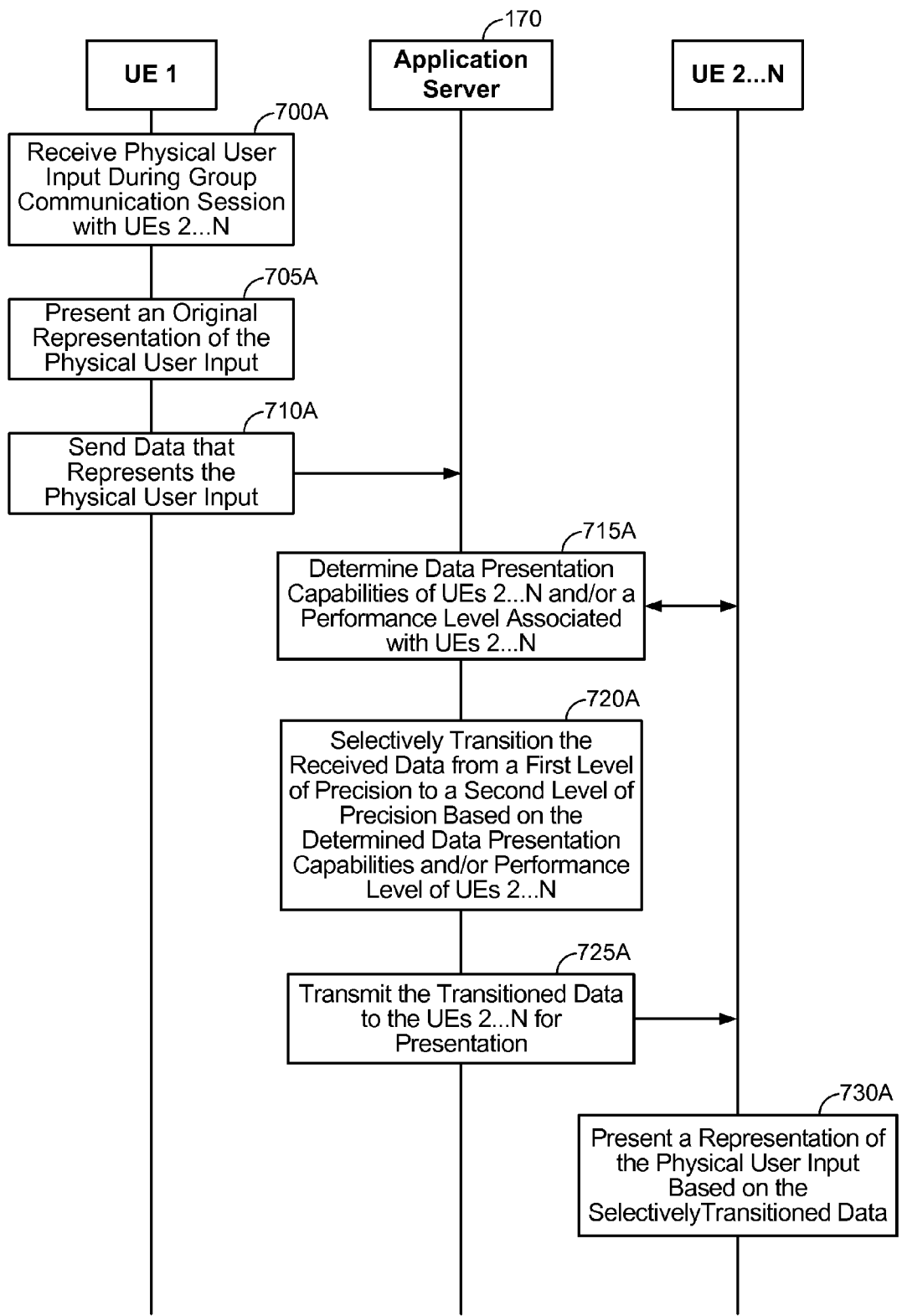
FIG. 7A illustrates an example implementation of the process of FIG. 5 in accordance with an embodiment of the invention.

FIG. 7A illustrates an example implementation of the process of FIG. 5 in accordance with an embodiment of the invention.

Figure 7B:
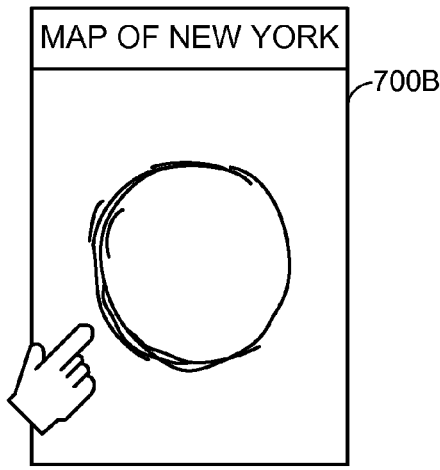
FIG. 7B illustrates an example of the original representation of physical user input for a user that draws a circle on a display screen of a UE and corresponding representations of the physical user input at target UEs in accordance with an embodiment of the invention.
Figure 7B:
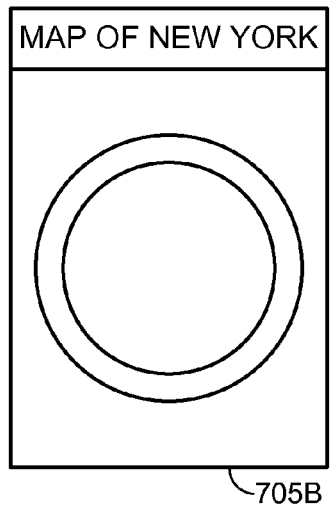
Figure 7B:
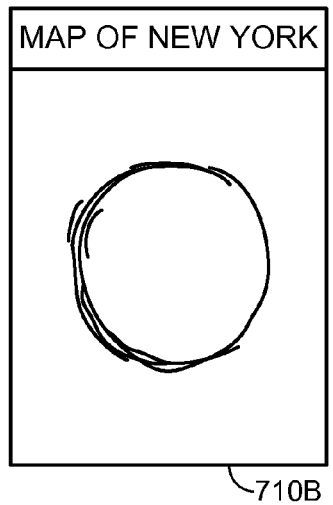
Figure 7B:
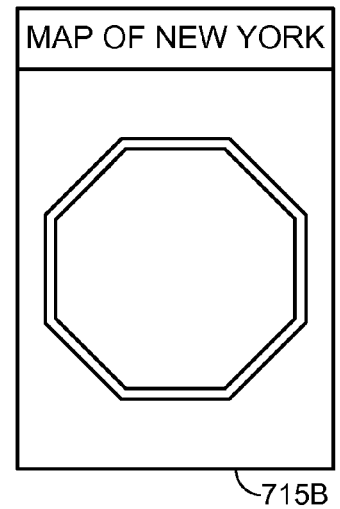

Referring to FIG. 7A, the UE 1 receives a physical user input during a group communication session with UE 2 . . . N, at 700A. Next, UE 1 presents an original representation of the physical user input at a first level of precision, at 705A. For example, referring to FIG. 7B, 700B is an example of the original representation of the physical user input for a user that draws a circle on a display screen of UE 1 that is showing a map of New York. As shown in 700B of FIG. 7B, the circle includes a lot of detail and is fairly complex because user movement is imperfect or was deliberately non-linear. Another example of the presentation of the original representation of the physical user input is the shape 600 discussed above with respect to FIG. 6.

Referring to FIG. 6, UE 1 sends data representative of the physical user input from 700A to the application server 170, 710A. The transmission of the data at 710A corresponds to FIG. 6 at 605 and/or FIG. 5 at 500. The application server 170 receives the data representative of the physical user input from UE 1, after which 715A, 720A and 725A correspond to 505, 510 and 515, respectively, of FIG. 5.

Once the data at the second level of precision is received by the target UE(s) (e.g. UE 2 . . . N), the target UE(s) present the selectively transitioned representation of the physical user input, at 730A. For example, referring to FIG. 7B, the representation of the physical user input at target UEs 2 . . . N can correspond to any of 705B, 710B or 715B. In 705B, a relatively simple circle is shown instead of the complexity of the original representation of 700B. For example, the application server 170 can transition the original data from UE 1 that is visually representative of the physical user input into a data format that defines a radius, thickness, color, and/or center point of the circle shown at 705B. 705B can be the representation presented at a relatively low performing target UE or a target UE with a poor connection. The presentation of 710B, on the other hand, is the same as 700B (i.e., no transition). In this case, 710B can be the representation presented at a relatively high performing target UE or a target UE with a good connection because the original representation from UE 1 did not undergo a quality (or precision) reduction. In 715B, a relatively simple octagon is shown instead of the complexity of the original representation of 700B. For example, the application server 170 can transition the original data from UE 1 that is representative of the physical user input into a data format (or level of precision) that defines the vertexes and/or center point of the octagon shown at 715B. 715B can be an example of another representation presented at a relatively low performing target UE or a target UE with a poor connection.

Figure 7C:
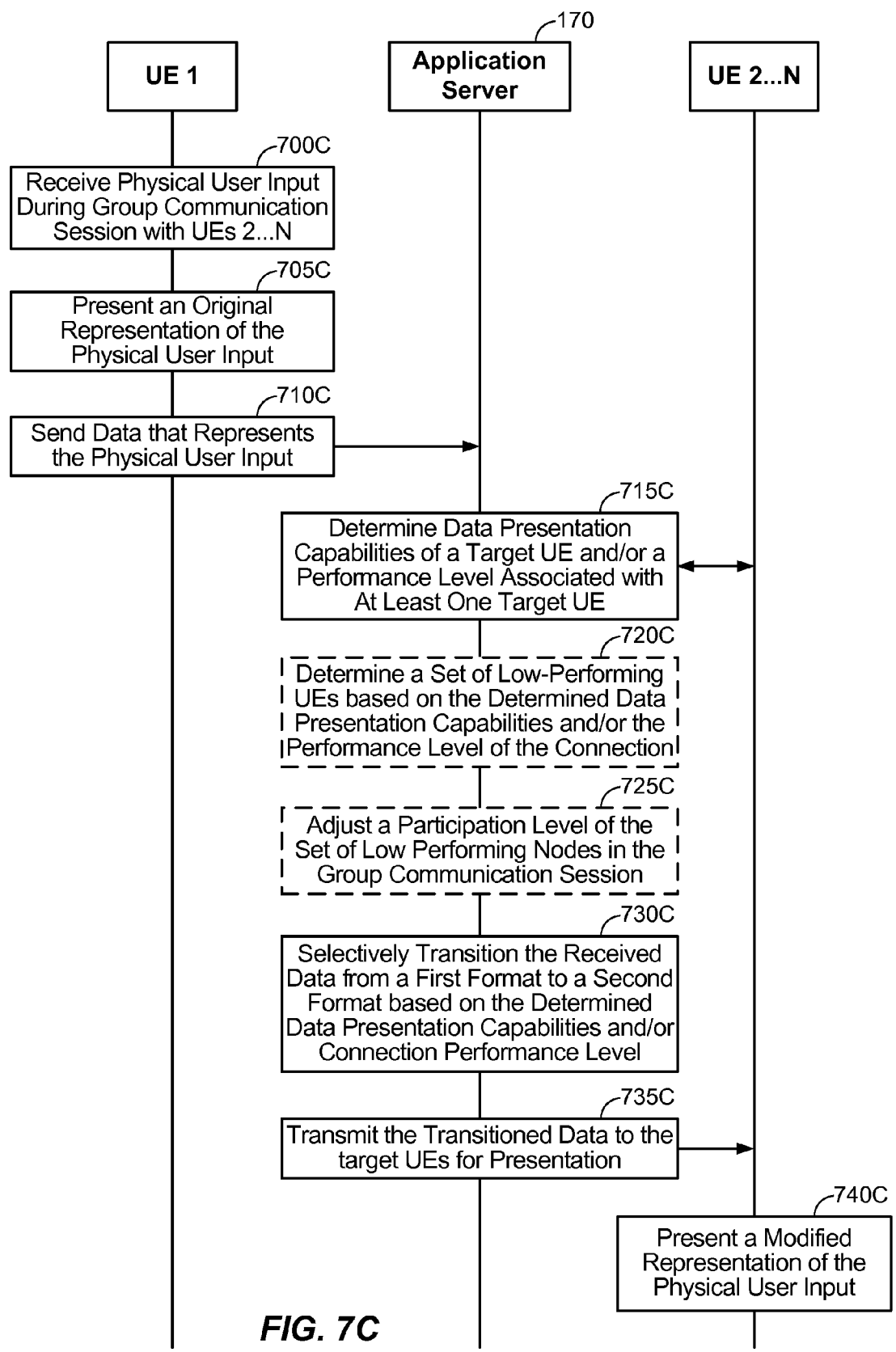
FIG. 7C illustrates a more detailed implementation of FIG. 7A in accordance with an embodiment of the invention.

FIG. 7C illustrates a more detailed implementation of FIG. 7A in accordance with an embodiment of the invention. In FIG. 7C, 700C through 715C and 730C through 740C correspond to 700A through 730A of FIG. 7A, respectively, and will not be discussed further for the sake of brevity.

FIG. 7C differs from FIG. 7A with the inclusion of 720C and 725C. Referring to FIG. 7C, after determining the data presentation capabilities of the target UE(s) and/or performance level of a connection to the target UE(s), at 715C, the application server 170 determines a set of low-performing UE(s) among the target UE(s) based on the determined data presentation capabilities and/or the performance level of the connection, at 720C. A low performing UE can include, but is not limited to, a UE with low display performance specifications (e.g., cannot handle high-resolution video stream), or a UE with a low throughput bandwidth connection (e.g., a 1× connection with the application server 170). Accordingly, the application server 170 may adjust the participation level of the set of low-performing nodes in the group session, at 725C. Examples of adjusting the participation level can include, but are not limited to: dropping the set of low performing UEs from a full duplex to a half-duplex interaction with respect to the communication session; lowering the frame rates transmitted to the set of low performing UEs; lowering an image resolution of image media transmitted from the application server 170 to the set of low performing nodes; and/or lowering an audio rate of audio media transmitted from the application server 170 to the set of low performing UEs.

Figure 8A:
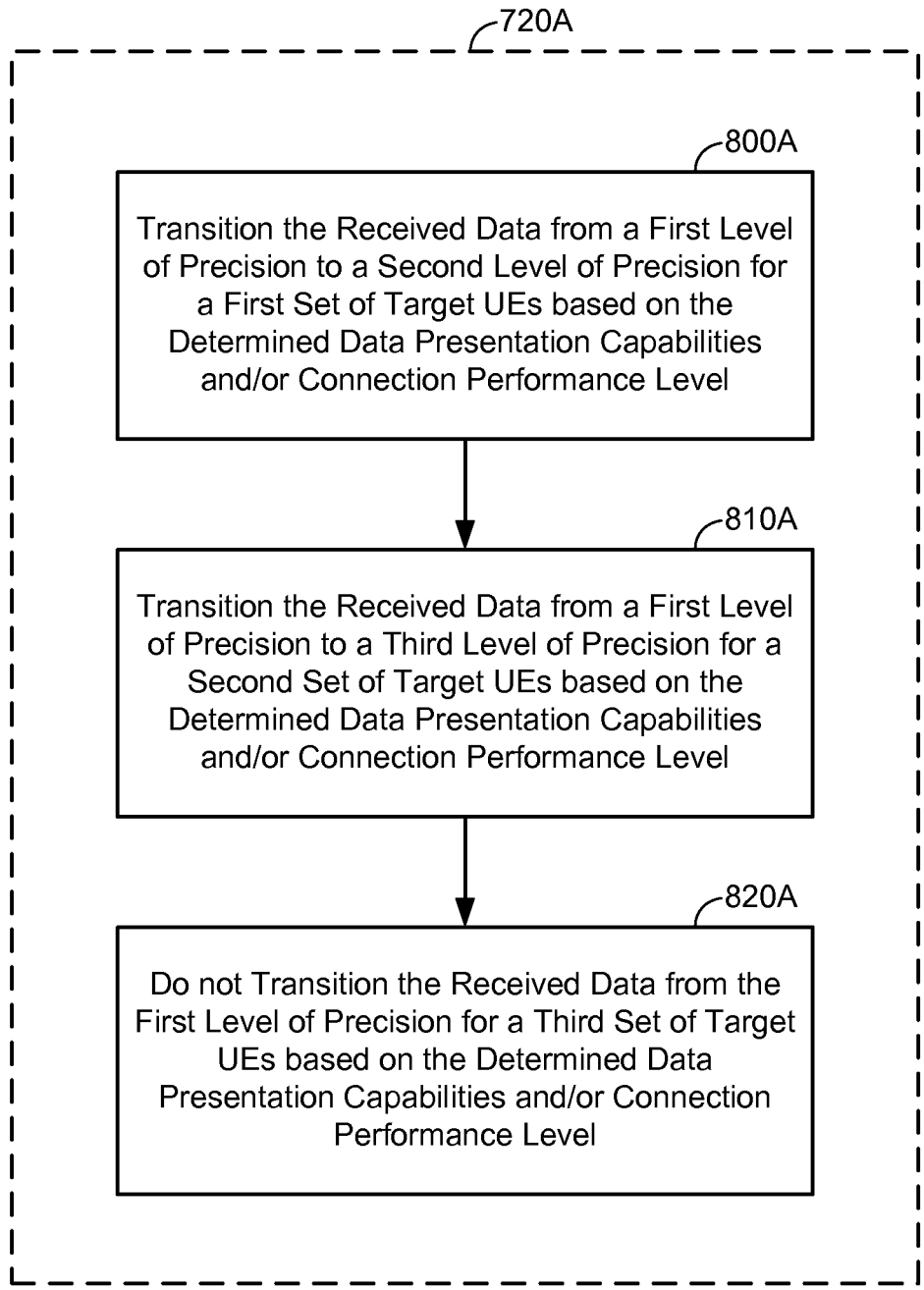
FIG. 8A illustrates an implementation of a portion of FIG. 7A in accordance with an embodiment of the invention.

FIG. 8A illustrates an implementation of the process of 720A of FIG. 7A in accordance with an embodiment of the invention. In FIG. 7A, UEs 2 . . . N are described whereby N can equal 2 or alternatively N can be greater than 2. However, FIG. 8A assumes that N is greater than two such that the application server 170 is responsible for re-formatting data representing UE 1's physical user input for a plurality of target UEs. More specifically, FIG. 8A illustrates an example where the application server 170 selectively transitions the received data into different formats (or levels of precision) for different sets of target UEs based on each set's respective determined data presentation capabilities and/or connection level.

Referring to FIG. 8A, assume that determination of 715A of FIG. 7A resulted in the application server 170 categorizing the plurality of target UEs into a first group including target UEs with low presentation capabilities and/or connection performance, a second group including target UEs with intermediate presentation capabilities and/or connection performance and a third group including target UEs with high presentation capabilities (e.g., top-of-the-line smart phone) and/or connection performance (e.g., 3G, 4G, Wi-Fi connection).

Figure 8B:
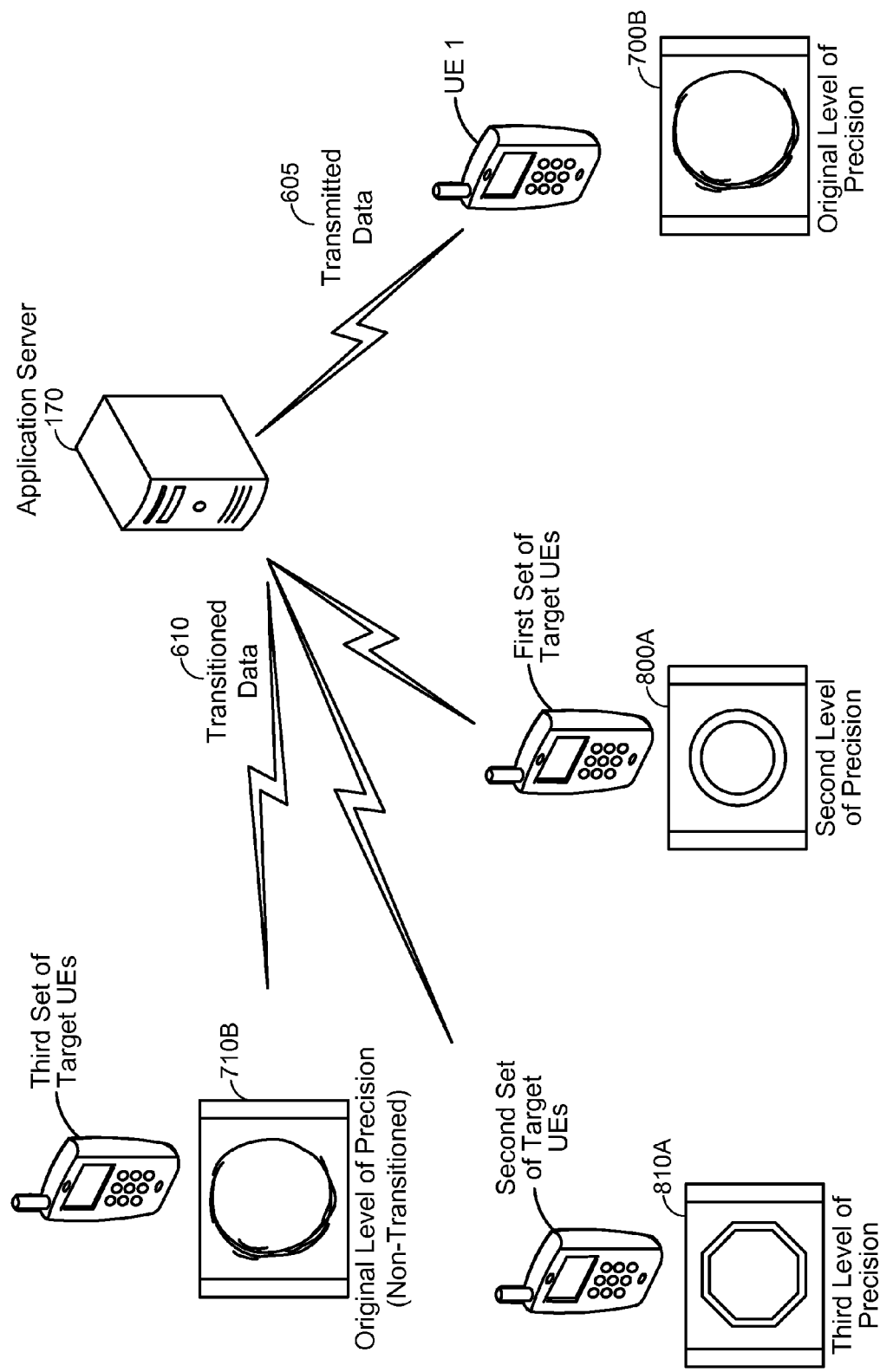
FIG. 8B illustrates an example implementation of FIG. 8A in accordance with an embodiment of the invention.

Under these assumptions, referring to FIGS. 8A and 8B, the selective transitioning of 720A of FIG. 7A can include a first transition of the received data from the first level of precision (i.e., the received level of precision, such as shape 600 of FIG. 6 or 700B of FIG. 7B or FIG. 8B) to a second level of precision for the first group (e.g., as shown in 705B of FIG. 7B and/or FIG. 8B, for example), 800A, the selective transitioning of 720A of FIG. 7A can include a second transition of the received data from the first level of precision into a third level of precision for the second group (e.g., as shown in 715B of FIG. 7B and/or FIG. 8B, for example), 810A, and the selective transitioning of 720A of FIG. 7A can include no transition of the received data for the third group, 820A (e.g., as shown in 710B of FIG. 7B and/or FIG. 8B, for example).

Figure 9:
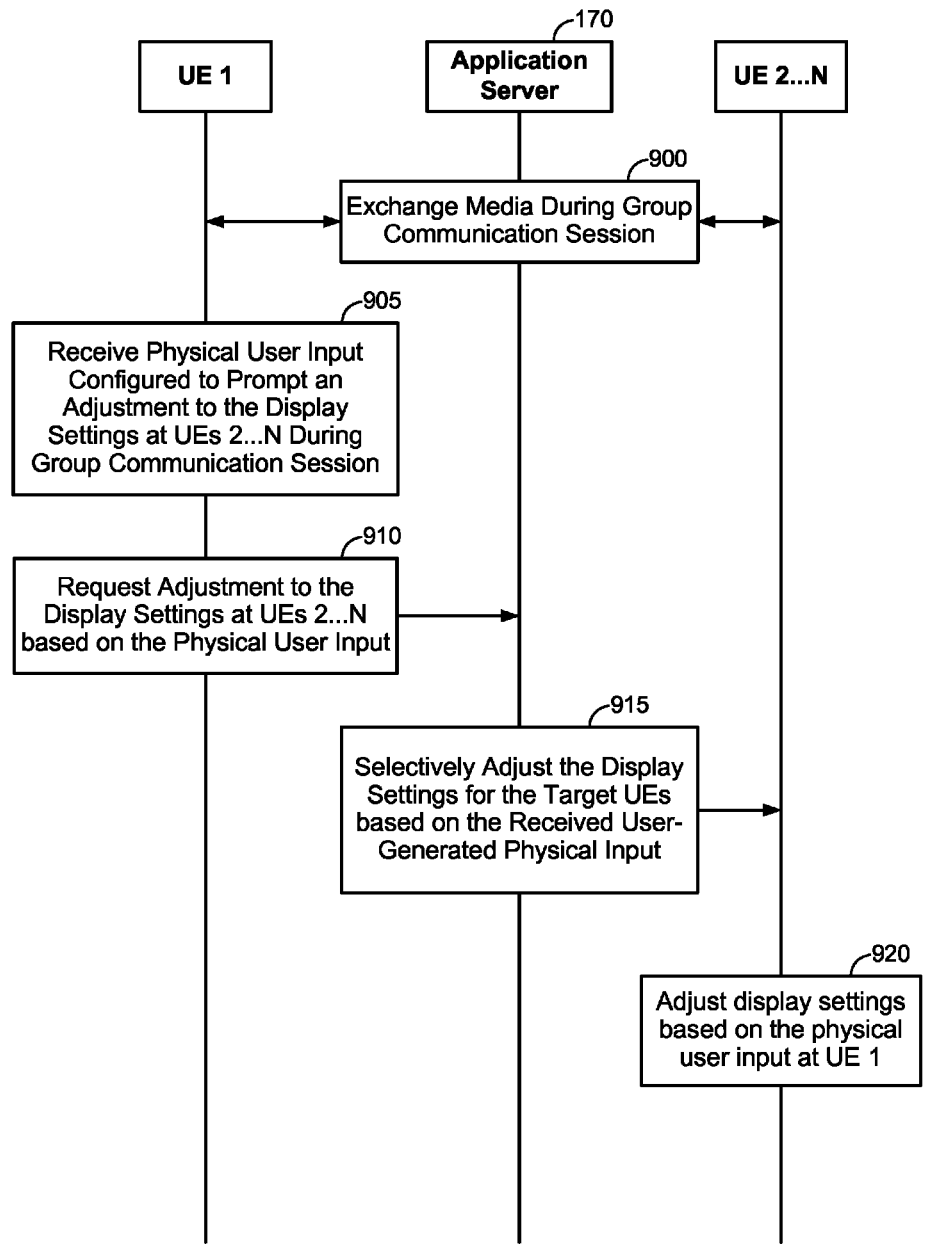
FIG. 9 illustrates a process of selectively adjusting display settings for one or more target UEs during a communication session based on received user-generated physical input.

While the above-described embodiments related to FIGS. 5 through 8B are directed to sharing data that represents physical user input between UEs in a communication session, FIG. 9 is directed towards using physical user input at a given UE to control device display settings at one or more other UEs participating in the communication session. As will be appreciated from the description below with respect to FIGS. 9 and 10, any of the processes described above with respect to FIGS. 5 through 8B can be executed in parallel with the processes of FIGS. 9 and/or 10. Alternatively, FIGS. 9 and 10 can be executed in an independent manner, such that the physical user input described below as triggering a display adjustment at the target UE(s) need not be associated with the physical user input described above with respect to FIGS. 5 through 8B.

FIG. 9 illustrates a process of selectively adjusting display settings for one or more target UEs during a communication session based on received user-generated physical input. In particular, FIG. 9 illustrates an example whereby physical user input at first UE (e.g., a user rotating UE 1) is reported to the application server 170 that is arbitrating a communication session for UEs 1 . . . N, and the application server 170 selectively controls or adjusts the display settings of the target UE(s) 2 . . . N (e.g., such as display settings of UE 2 is adjusted by rotating display orientation).

Referring to FIG. 9, UEs 1 . . . N and the application server 170 exchange media between UEs 1 . . . N during a group communication session, 900. During the group communication session, UE 1 receives a physical user input (e.g., rotation of the phone) that is recognized as a prompt to adjust display settings at one or more of the target UE(s) 2 . . . N, 905. For example, UE 1 may be provisioned with a set of pre-defined user gestures (or physical user inputs) that are each associated with corresponding display setting adjustment(s) to be implemented at UEs in communication with UE 1. For example, UE 1 may detect that the user temporarily reorients UE 1 (e.g., from portrait mode to landscape mode). This detection can occur based on sensor coupled to UE 1, such as an accelerometer, a gyroscope, etc. UE 1 reports the detected physical user input to the application server 170 in 910 to request that the application server 170 change the display settings at the target UE(s) 2 . . . N. Table 1 (below) lists a set of example pre-defined physical user inputs that, when detected at UE 1, are associated display setting adjustments for one or more of target UE(s) 2 . . . N:

TABLE 1

| Physical User Input at UE 1 | Display Setting Adjustment at Target UE(s) | Affected UE(s) |
| --- | --- | --- |
| Rotate UE 90 degrees clockwise | Rotate Display Screen Orientation by 90 degrees clockwise | UEs 2 . . . N |
| Shake UE | Shake or Rattle Screen Display, (Optional: Vibrate UE) | UE 2 and UE 4 only |
| Tap Left Side of UE X times | Change Color Scheme of Screen Display Based on X | UE 2 and UE 3 |

In response to the request of 910, the application server 170 selectively adjusts the display settings for the target UE(s) (e.g., UE 2 . . . N), 915. In an example, the selective adjustment to the display settings can be implemented within the media stream being mediated by the application server 170, or alternatively can be implemented indirectly at the target UE(s) 2 . . . N based on control signaling from the application server 170. For example, if the physical user input detected at 905 is associated with an orientation change for UEs 2 . . . N, the orientation change can be server-implemented such that the application server 170 itself re-maps the graphical media to the target orientation. Alternatively, the orientation change can be UE-implemented, whereby the application server 170 sends an orientation adjustment command to UEs 2 . . . N, after which UEs 2 . . . N will re-orient the unchanged incoming media stream to the target orientation at their end. Irrespective of whether the display setting adjustment is server-implemented or UE-implemented, at 920, the display settings at the target UE(s) 2 . . . N are adjusted based on the physical user input from 905.

Figure 10:
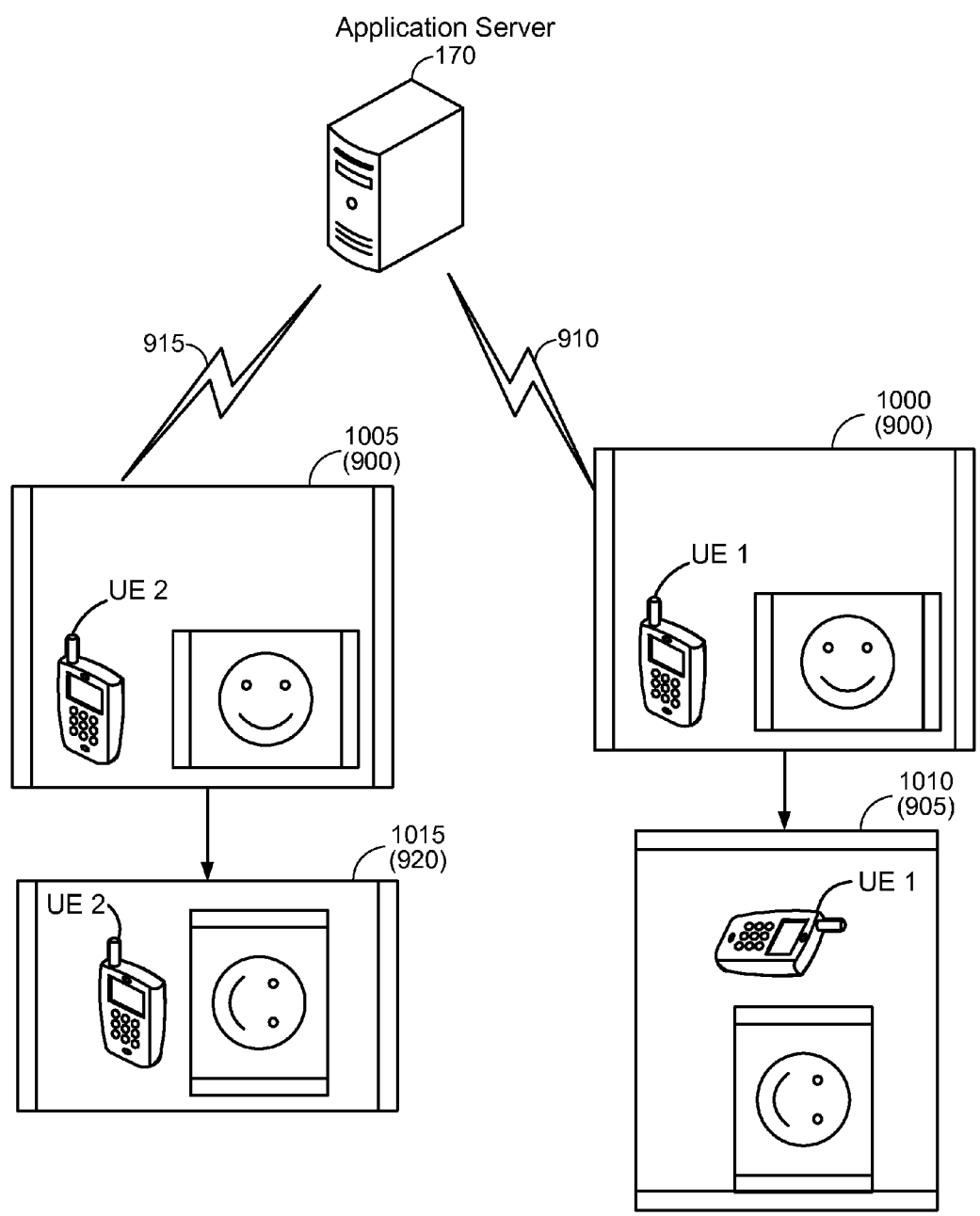
FIG. 10 illustrates an example implementation of the process described in FIG. 9 in accordance with an embodiment of the invention.

FIG. 10 illustrates an example implementation of the process described in FIG. 9 in accordance with an embodiment of the invention. In particular FIG. 10 illustrates example screen shots at a transmitting UE 1 and a target UE 2 during an example implementation of the process of FIG. 9.

Referring to FIG. 10, 1000 and 1010 illustrate states of the group communication session at UE 1 and UE 2, respectively, during 900 and 905 of FIG. 9, respectively. Accordingly, as shown in 1000 and 1005, UE 1 and UE 2 are each held in an upright position (or vertical orientation) by their respective users and UEs 1 and 2 are displaying a vertically oriented smiley face graphic. Next, during the communication session, a user of UE 1 turns UE 1 90 degrees so that UE 1 obtains a horizontal orientation, 1010. The user's turning of UE 1 corresponds to the physical user input detected by UE 1 at 905 of FIG. 9. In an example, the turning of UE 1 can be a flip of UE 1 by its user that is deliberately made to change the orientation at UE 2. Alternatively, the turning of UE 1 can simply arise as a result of UE 1's user preferring a different orientation on his/her own phone. As shown in state 1010, the smiley face offset 90 degrees by virtue of the 90 degree turning of UE 1. In another example, however, UE 1 may include logic for adjusting the smiley face so that the smiley face still appears vertically oriented to the user of UE 1 even though UE 1 itself is horizontally oriented.

In 910, UE 1 reports the orientation change of UE 1 to prompt the application server 170 to adjust the orientation of a graphic being displayed at UE 2. Accordingly, in 915, the application server 170 adjusts the orientation at UE 2. In an example, in 915, the application server 170 can modify the graphical media being streamed to UE 2 by 90 degrees to implement the orientation adjustment for UE 2. In an alternative example, in 915, the application server 170 can send unmodified graphical media to UE 2 (if necessary) and can simply send control commands to UE 2 to instruct UE 2 to offset its orientation for the graphical media by 90 degrees (clockwise).

After the adjustment at 920, UE 2's state is shown in 1015. Thus, in state 1015, UE 2 is vertically oriented and the smiley face has been transitioned 90 degrees (clockwise) with a horizontal orientation. While not shown in FIG. 10 explicitly, the orientation transition can occur to encourage the user of UE 2 to engage in the communication session in landscape mode instead of portrait mode. Thus, while state 1015 shows UE 2 with a vertical orientation, the user of UE 2 may be likely to alter UE 2's orientation to conform to the smiley face orientation.

While not illustrated in FIGS. 9 and/or 10, it is possible that certain target UEs may lack the ability to implement the display setting adjustment requested by the user of UE 1 via his/her physical user input. For example, some target UEs may not be able to adjust their display settings (e.g., rotate display orientation), therefore the application server 170 will not adjust the display settings for these target UEs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an application server configured to arbitrate a communication session between a plurality of user equipments (UEs), comprising:

receiving, from a given UE, data that is configured to visually represent physical user input that is detected at the given UE at a first level of precision;

determining data presentation capabilities of at least one target UE and/or a performance level associated with a connection between the application server and the at least one target UE;
selectively transitioning the received data from the first level of precision to a second level of precision and a third level of precision based on the determination, the third level of precision being an intermediate level of precision between the first and second levels of precision; and
transmitting the selectively transitioned data to the at least one target UE for presentation by sending the selectively transitioned data with the second level of precision to a first set of target UEs and sending the selectively transitioned data with the third level of precision to a third set of target UEs.

2. The method of claim 1, wherein the selectively transitioning refrains from transitioning the received data for a given target UE among the at least one target UE if the determining determines that the given target UE's data presentation capabilities and/or connection performance level are above a threshold.

3. The method of claim 1, wherein the selectively transitioning transitions the received data for a given target UE among the at least one target UE if the determining determines that the given target UE's data presentation capabilities and/or connection performance level are below a threshold.

4. The method of claim 1, further comprising:
transmitting the received data at the first level of precision to a third set of target UEs.

5. The method of 1, further comprising:
adjusting a participation level of the one or more UEs in the communication session based on the determination.

6. The method of claim 5,
wherein the adjusting transitions the at least one target UE from full-duplex to half-duplex.

7. The method of claim 1, wherein the received data at the second level of precision corresponds to a simplified or reduced version of the received data at the first level of precision.

8. The method of claim 7, wherein the received data at the second level of precision includes fewer data points than the received data at the first level of precision.

9. The method of claim 1, wherein the determined data presentation capabilities of the at least one target UE include a display size, resolution, frame rate, display resolution, aspect ratio, processor speed, memory capacity, type of memory, clock frequency, battery life and/or power conservation requirements.

10. The method of claim 1, wherein the determined performance level associated with the connection is based on in-call performance metrics and/or a type of serving network of the at least one target UE.

11. The method of claim 10, wherein the in-call performance metrics include packet loss and/or round trip delay.

12. An application server configured to arbitrate a communication session between a plurality of user equipments (UEs), comprising:
means for receiving, from a given UE, data that is configured to visually represent physical user input that is detected at the given UE at a first level of precision;
means for determining data presentation capabilities of at least one target UE and/or a performance level associated with a connection between the application server and the at least one target UE;
means for selectively transitioning the received data from the first level of precision to a second level of precision and a third level of precision based on the determination, the third level of precision being an intermediate level of precision between the first and second levels of precision; and
means for transmitting the selectively transitioned data to the at least one target UE for presentation by sending the selectively transitioned data with the second level of precision to a first set of target UEs and sending the selectively transitioned data with the third level of precision to a third set of target UEs.

13. An application server configured to arbitrate a communication session between a plurality of user equipments (UEs), comprising:
a processor for executing computer-executable instructions;
a memory storing said instructions, accessible to said processor;
said instructions including:
logic configured to receive, from a given UE, data that is configured to visually represent physical user input that is detected at the given UE at a first level of precision;
logic configured to determine data presentation capabilities of at least one target UE and/or a performance level associated with a connection between the application server and the at least one target UE;
logic configured to selectively transition the received data from the first level of precision to a second level of precision and a third level of precision based on the determination, the third level of precision being an intermediate level of precision between the first and second levels of precision; and
logic configured to transmit the selectively transitioned data to the at least one target UE for presentation by sending the selectively transitioned data with the second level of precision to a first set of target UEs and sending the selectively transitioned data with the third level of precision to a third set of target UEs.

14. A non-transitory computer-readable medium containing instructions stored thereon, which, when executed by an application server configured to arbitrate a communication session between a plurality of user equipments (UEs), cause the application server to perform operations, the instructions comprising:
program code to receive, from a given UE, data that is configured to visually represent physical user input that is detected at the given UE at a first level of precision;
program code to determine data presentation capabilities of at least one target UE and/or a performance level associated with a connection between the application server and the at least one target UE;
program code to selectively transition the received data from the first level of precision to a second level of precision and a third level of precision based on the determination, the third level of precision being an intermediate level of precision between the first and second levels of precision; and
program code to transmit the selectively transitioned data to the at least one target UE for presentation by sending the selectively transitioned data with the second level of precision to a first set of target UEs and sending the selectively transitioned data with the third level of precision to a third set of target UEs.

* * * * *